US011280915B2

(12) United States Patent
Matsue

(10) Patent No.: US 11,280,915 B2
(45) Date of Patent: Mar. 22, 2022

(54) SATELLITE RADIO WAVE RECEIVING DEVICE, ELECTRONIC TIMEPIECE, POSITIONING CONTROL METHOD, AND NON-TRANSITORY COMPUTER-READABLE STORAGE MEDIUM

(71) Applicant: CASIO COMPUTER CO., LTD., Tokyo (JP)

(72) Inventor: Takeshi Matsue, Kokubunji (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 459 days.

(21) Appl. No.: 16/294,181

(22) Filed: Mar. 6, 2019

(65) Prior Publication Data

US 2019/0277975 A1 Sep. 12, 2019

(30) Foreign Application Priority Data

Mar. 7, 2018 (JP) .............................. JP2018-040629

(51) Int. Cl.
*G01S 19/39* (2010.01)
*G01S 19/34* (2010.01)

(52) U.S. Cl.
CPC ............ *G01S 19/396* (2019.08); *G01S 19/34* (2013.01)

(58) Field of Classification Search
CPC ................................ G01S 19/34; G01S 19/396
See application file for complete search history.

(56) References Cited

U.S. PATENT DOCUMENTS 8,566,022 B1 * 10/2013 Starenky ............... G01S 19/396
701/410
2005/0228589 A1 * 10/2005 Diggelen .............. G01S 19/396
702/1

(Continued)

FOREIGN PATENT DOCUMENTS

JP 2009-041932 A 2/2009
JP 2010-145228 A 7/2010

(Continued)

OTHER PUBLICATIONS

English translation of JP 2009041932 A (Year: 2021).*

(Continued)

*Primary Examiner* — Bernarr E Gregory
*Assistant Examiner* — Fred H Mull
(74) *Attorney, Agent, or Firm* — Scully Scott Murphy & Presser

(57) ABSTRACT

A satellite radio wave receiving device including: one or more processors configured to: cause a receiver to start a receiving operation of receiving radio waves from positioning satellites; perform a current position calculation to calculate a current position based on the radio waves received; calculate a positioning accuracy of the current position; decide whether or not to adopt the current position based on a number of positioning satellites from which the receiver has received radio waves and the positioning accuracy; in response to deciding to adopt the current position, cause the receiver to stop the receiving operation; and in response to deciding to not adopt the current position, cause the receiver to continue the receiving operation of receiving radio waves from the positioning satellites and repeat performance of the current position calculation to calculate current positions based on the radio waves received during the continued receiving operation.

12 Claims, 5 Drawing Sheets

(56) References Cited

U.S. PATENT DOCUMENTS

| | | | | |
|---|---|---|---|---|
| 2009/0231192 A1* | 9/2009 | van Diggelen | ......... | G01S 19/27 342/357.66 |
| 2010/0277367 A1* | 11/2010 | Dicke | ................ | G01S 19/34 342/357.74 |
| 2016/0109246 A1* | 4/2016 | Lambert | ................ | G01S 19/01 701/450 |

FOREIGN PATENT DOCUMENTS

| | | |
|---|---|---|
| JP | 2012-021850 A | 2/2012 |
| JP | 2014-066550 A | 4/2014 |
| JP | 2016-024064 A | 2/2016 |

OTHER PUBLICATIONS

English translation of JP 2010145228 A (Year: 2021).*
English translation of JP 2012021850 A (Year: 2021).*
English translation of JP 2014066550 A (Year: 2021).*
English translation of JP 2016024064 A (Year: 2021).*
Notice of Reasons for Refusal dated May 26, 2020 received in Japanese Patent Application No. JP 2018-040629 together with an English language translation.

* cited by examiner

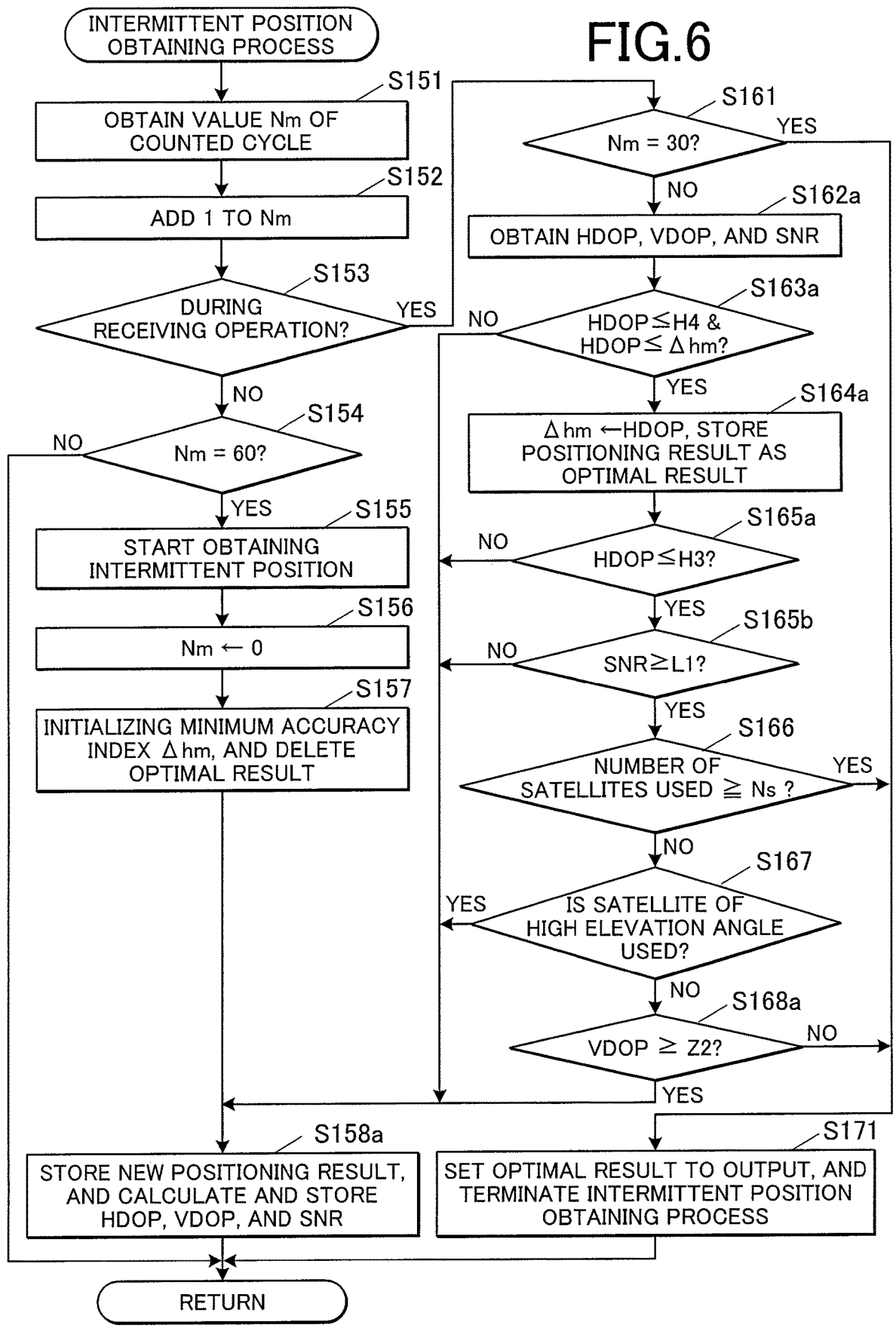

SATELLITE RADIO WAVE RECEIVING DEVICE, ELECTRONIC TIMEPIECE, POSITIONING CONTROL METHOD, AND NON-TRANSITORY COMPUTER-READABLE STORAGE MEDIUM

CROSS-REFERENCE TO RELATED APPLICATIONS

This application is based upon and claims priority to prior Japanese Patent Application No. 2018-040629, filed on Mar. 7, 2018, the entire content of Japanese Patent Application No. 2018-040629 is incorporated herein by reference.

BACKGROUND

The technical field relates to a satellite radio wave receiving device, an electronic timepiece, and a positioning control method.

Conventionally, a positioning device identifies the current position by receiving radio waves from positioning satellites and performing calculation for positioning. In order to obtain a current position, it is necessary to receive radio waves from at least three or four satellites. As the number of received radio signals (the number of positioning satellites) used for positioning calculation increases, the positioning accuracy is generally improved. On the other hand, for receiving radio waves from many positioning satellites, a load for radio wave capturing operation from the positioning satellites and the time required to capture radio waves from the large number of positioning satellites increase, so that the power consumption increases.

For example, a Japanese patent document JP2014-66550A discloses a technique in which, if radio waves from a predetermined number of positioning satellites are captured during continuous positioning operation, the radio wave capturing operation from the further positioning satellite is not performed and positioning calculation is performed by the radio signal from the captured positioning satellites, and if the number of the captured radio waves becomes less than the predetermined number, the capturing operation is restarted.

However, depending on the position of the captured positioning satellites and their distribution, sufficient positioning accuracy may not be obtained in some cases, using only the number of captured positioning satellites. That is, conventionally, appropriate obtaining accuracy in the current position and suppression of power consumption have not been achieved simultaneously.

SUMMARY

A satellite radio wave receiving device, an electronic timepiece, a method, and a computer-readable storage medium storing instructions for controlling a positioning operation are disclosed.

In an embodiment, there is provided a satellite radio wave receiving device comprising: one or more processors configured to: cause a receiver to start a receiving operation of receiving radio waves from positioning satellites; perform a current position calculation to calculate a current position based on the radio waves received by the receiver; calculate a positioning accuracy of the current position; decide whether or not to adopt the current position based on a number of positioning satellites from which the receiver has received radio waves and the positioning accuracy of the current position; in response to deciding to adopt the current position, cause the receiver to stop the receiving operation; and in response to deciding to not adopt the current position, cause the receiver to continue the receiving operation of receiving radio waves from the positioning satellites and repeat performance of the current position calculation to calculate current positions based on the radio waves received during the continued receiving operation.

In another embodiment, there is provided a satellite radio wave receiving device comprising: means for causing a receiver to start a receiving operation of receiving radio waves from positioning satellites; means for performing a current position calculation to calculate a current position based on the radio waves received by the receiver; means for calculating a position accuracy of the current position; means for deciding whether or not to adopt the current position based on a number of positioning satellites from which the receiver has received radio waves and the positioning accuracy of the current position; and means for, in response to deciding to adopt the current position, causing the receiver to stop the receiving operation; and means for, in response to deciding to not adopt the current position, causing the receiver to continue the receiving operation of receiving radio waves from the positioning satellites and repeating performance of the current position calculation to calculate current positions based on the radio waves received during the continued receiving operation.

In another embodiment, there is provided a positioning control method performed by a satellite radio wave receiving device including a receiver, the method comprising: causing the receiver to start a receiving operation of receiving radio waves from positioning satellites; performing a current position calculation to calculate a current position based on the radio waves received by the receiver; calculating a positioning accuracy of the current position; deciding whether or not to adopt the current position based on a number of positioning satellites from which the receiver has received radio waves and the positioning accuracy of the current position; in response to deciding to adopt the current position, causing the receiver to stop the receiver operation; and in response to deciding to not adopt the current position, causing the receiver to continue the receiving operation of receiving radio waves from the positioning satellites and repeating calculation of the current position calculation to calculate current positions based on the radio waves received during the continued receiving operation.

In another embodiment, there is provided a non-transitory computer-readable storage medium storing instructions that cause one or more computers to at least perform: causing a receiver to start a receiving operation of receiving radio waves from positioning satellites; performing a current position calculation to calculate a current position based on the radio waves received by the receiver; calculating a positioning accuracy of the current position; deciding whether or not to adopt the current position based on a number of positioning satellites from which the receiver has received radio waves and the positioning accuracy of the current position; in response to deciding to adopt the current position, causing the receiver to stop the receiving operation; and in response to deciding to not adopt the current position, causing the receiver to continue the receiving operation of receiving radio waves from the positioning satellites and repeating performance of the current position calculation to calculate current positions based on the radio waves received during the continued receiving operation.

BRIEF DESCRIPTION OF THE DRAWINGS

FIG. 6 illustrates a modification example of an intermittent position obtaining process.

DETAILED DESCRIPTION

An embodiment will now be described with reference to the drawings.

Figure 1:
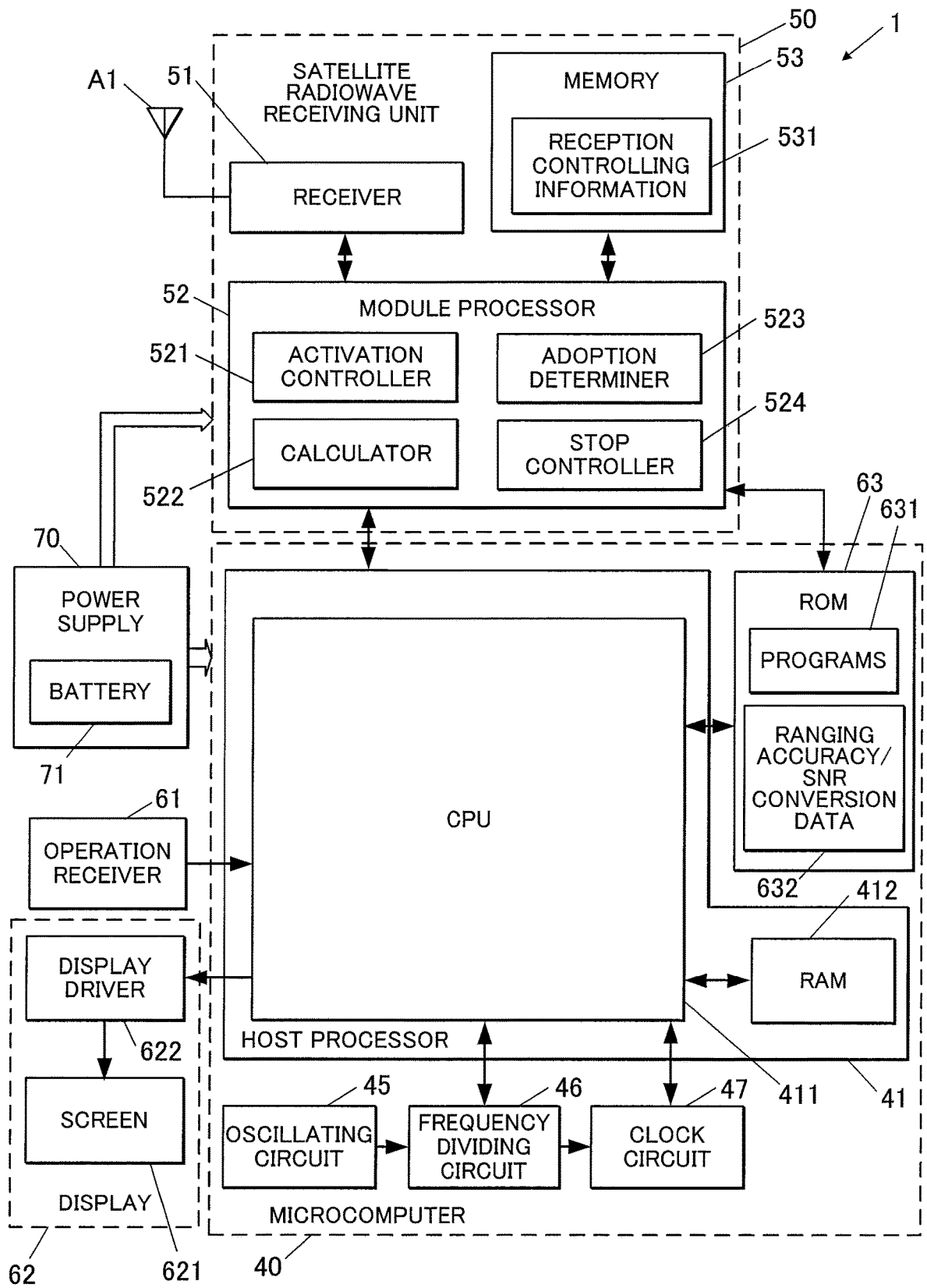
FIG. 1 is a block diagram illustrating a functional configuration of an electronic timepiece according to an embodiment.

FIG. 1 is a block diagram illustrating a functional configuration of an electronic timepiece 1 according to an embodiment.

An electronic timepiece 1 includes a microcomputer 40, a satellite radio wave receiving unit 50, an antenna Al, an operation receiver 61, a display 62, a read only memory (ROM) 63, and a power supply 70.

The microcomputer 40 performs various kinds of operation, such as control of the electronic timepiece 1, storage in memory, and counting of date and time. The microcomputer 40 includes a host processor 41, an oscillating circuit 45, a frequency dividing circuit 46, and a timing circuit 47 (a clock circuit).

The host processor 41 administers the overall operation of the electronic timepiece 1. The host processor 41 includes a central processing unit (CPU) 411 and a random access memory (RAM) 412.

The CPU 411 performs various calculations to control a normal display of date and time and operation relevant to the various functions of the electronic timepiece 1, such as alarm notification. The CPU 411 also obtains the results of the positioning operation and the date and time obtaining operation performed by the satellite radio wave receiving unit 50 and controls display and notification based on the obtained results.

The RAM 412 provides the CPU 411 with a working memory and stores temporary data. The temporary data includes information on time zone settings and local time settings (including daylight-saving time). The time zone settings are used to display the current date and time (local time) at a set position, such as the current position, in a region in the world. These local time settings may be updated in accordance with the current position information adopted through the positioning operation. The RAM 412 may be external to the microcomputer 40. The RAM 412 may also include a rewritable non-volatile memory in addition to DRAM.

The oscillating circuit 45 generates and outputs a signal with a predetermined frequency of, for example, 32.768 kHz (clock signal). A crystal oscillator, for example, is used to generate clock signals. The crystal oscillator may be external to the microcomputer 40. The frequency of the clock signals output from the oscillating circuit 45 may contain errors within an allowable range for the electronic timepiece 1.

The frequency dividing circuit 46 frequency-divides the clock signals input from the oscillating circuit 45 into frequency-division signals with a predetermined frequency division ratio, and outputs the frequency-division signals. The frequency dividing circuit 46 may output frequency-division signals of multiple frequencies. The frequency division ratio may be changed by the CPU 411.

The timing circuit 47 counts signals with a predetermined frequency input from the frequency dividing circuit 46, which may be identical to that of the clock signals, to count and retain the current date and time. The accuracy of the date and time counted by the timing circuit 47 depends on the accuracy of the clock signals from the oscillating circuit 45. The date and time counted by the timing circuit 47 may deviate from an accurate date and time. The CPU 411 can modify the counted date and time based on the current date and time obtained by the satellite radio wave receiving unit 50.

The satellite radio wave receiving unit 50 is a satellite radio wave receiving device according to the present embodiment, and can receive radio waves transmitted from a positioning satellite in a global navigation satellite system (GNSS), such as Global Positioning System (GPS) of the U.S.A., and a system for compensation thereof. The satellite radio wave receiving unit 50 processes the received radio waves to obtain and/or adopt information on the current date and time and the current position. In response to a request of the host processor 41 (CPU 411), the satellite radio wave receiving unit 50 outputs requested information in a predetermined format to the host processor 41. The satellite radio wave receiving unit 50 includes a receiver 51, a module processor 52, and a memory 53.

The receiver 51 receives radio waves transmitted from a target positioning satellite. As the receiving operation, the receiver 51 receives and detects radio waves including signals (a navigation message) transmitted from the positioning satellite, and performs the acquiring process for identifying the positioning satellite and the phase of the a navigation message. The receiver 51 tracks the radio waves transmitted from the positioning satellite based on the identification information on the acquired positioning satellite and the phase, and continuously demodulate and receive the signals.

The module processor 52 includes a CPU and a RAM and controls the various kinds of operation of the satellite radio wave receiving unit 50. In response to an instruction of the host processor 41, the module processor 52 causes the receiver 51 to receive radio waves from a positioning satellite at an appropriate timing and period. The module processor 52 functions as an activation controller 521, a calculator 522, an adoption determiner 523, and a stop controller 524. The module processor 52 obtains necessary information from the radio waves received at the receiver 51 to perform various calculations as needed, and obtains and/or adopts the current date and time and/or the current position. The module processor 52 may be provided with a dedicated hardware circuit for various calculations. The positioning result may be output in a common format such as NMEA-0183, or in a format specific to the electronic timepiece 1. The data output by the hardware circuit in a predetermined format may be processed as needed and output by the CPU. The RAM is provided on a control chip (substrate) of the module processor 52. Alternatively, the RAM may be externally mounted on the control chip. When the current date and time and the current position are obtained and adopted, the module processor 52 can calculate values regarding a moving speed and acceleration of the current position, an SNR (signal-to-noise ratio defined the same as a C/N ratio here) of radio waves from each positioning satellite, a direction (elevation angle, azimuth angle) of each positioning satellite from the current position, dilution of precision (DOP), and positioning accuracy described later.

The memory 53 stores receipt controlling information 531, such as various parameters and received information, and control programs executed by the module processor 52 in the satellite radio wave receiving unit 50. Examples of the parameters include format data for navigation messages from each positioning satellite. The received information includes, for example, predicted orbit information (almanac) and precise orbit information (ephemeris), which are obtained from each positioning satellite. The memory 53 is a non-volatile memory and may be external to a control chip (a substrate) of the module processor 52.

The operation receiver 61 receives external input operation, such as user operation. The operation receiver 61 includes a push-button switch and a winding crown. In response to pressing operation of the push-button switch or a pulling-out, rotating, or pushing-back operation of the winding crown, the operation receiver 61 outputs a corresponding operational signal to the host processor 41 (the CPU 411). Alternatively, the operation receiver 61 may include a touch sensor provided on the display screen 621 of the display 62.

The display 62 shows various pieces of information in accordance with the control of the host processor 41. The display 62 includes a display driver 622 and a screen 621. The screen 621 displays digital information on a liquid crystal display (LCD) of a segment, dot-matrix or combination type. Alternatively, the display 62 may be configured to show information with needles and a stepping motor that rotates the needles, instead of the digital display on the display screen 621. In response to a control signal from the CPU 411, the display driver 622 outputs a drive signal on the display screen 621 to show information on the display screen 621. The information appearing on the display 62 includes the date and time information (in particular, the current date and time) according to the date and time counted by the timing circuit 47, and other functions of the electronic timepiece 1 such as set time information on alarm notification. Information on the current position adopted through positioning operation and local time settings can also be displayed.

The ROM 63 stores programs 631 and initial setting data. The programs 631 are for the host processor 41 and the module processor 52 to perform control operation. The ROM 63 may store a non-volatile memory, such as a rewritable and updatable flash memory, in addition to or in place of a mask ROM. The ROM 63 is read- and write-accessible by the host processor 41 and the module processor 52 and detachable from a mount portion, such as a slot.

The programs 631 include control programs for obtaining and adopting the current time and date and positioning operation. The ROM 63 contains ranging accuracy/SNR conversion data 632 that indicates the correspondence relation between the received strength of radio waves received by the satellite radio wave receiving unit 50 and the ranging accuracy corresponding to the received strength of the radio waves, i.e., the expected deviation between the measured current position and the actual position of the electronic timepiece 1 (the satellite radio wave receiving device). The ranging accuracy/SNR conversion data 632 may be in the form of a table of the correspondence between SNRs and ranging accuracies, or a formula or approximation formula, for calculating the ranging accuracy from a SNR. The ranging accuracy/SNR conversion data 632 may be stored in the memory 53 of the satellite radio wave receiving unit 50.

The power supply 70 supplies power from a battery 71 to various units of the electronic timepiece 1, such as microcomputer 40 and the satellite radio wave receiving unit 50, at a predetermined drive voltage. The supply or non-supply of power to the satellite radio wave receiving unit 50 can be controlled separately from power supply to the microcomputer 40 under the control of the host processor 41. The battery 71 is a replaceable dry-cell battery or a rechargeable battery. The power supply 70 may include solar panels and an electricity charging unit (power storage) as the battery 71.

Next, the positioning operation of the electronic timepiece 1 according to this embodiment will now be described.

The satellite radio wave receiving unit 50 of the electronic timepiece 1 receives radio waves from a plurality of (i.e., three or more) positioning satellites to obtain navigation messages. The electronic timepiece 1 performs positioning calculations based on the received navigation messages and the timing to receive the navigation messages. In the positioning calculations, the electronic timepiece 1 calculates the accuracy of the positioning result (positioning accuracy).

A navigation message received from each of four or more positioning satellites (if there are three positioning satellites, the altitude of the current position is set as a fixed value) contains an ephemeris. In the positioning calculations, the current position of each satellite based on the ephemeris and a difference in the timing to receive the navigation message from each positioning satellite (pseudo range) are used to calculate four (three if the altitude is fixed) unknowns, i.e., three (two if the altitude is fixed) components of the current position of electronic timepiece 1 and a component of the current time and date. This calculation is performed by an iterative calculation (successive approximation), for example, the Newton-Raphson method (Newton's method). The iterative calculation involves a numerical convergence of a predetermined initial value to an unknown value. At this time, a value corresponding to the error range of the current position can be calculated as the positioning accuracy, considering the positional relationship of the multiple positioning satellites from which the radio waves have been received and a receiving state of the received radio waves.

Figure 2:
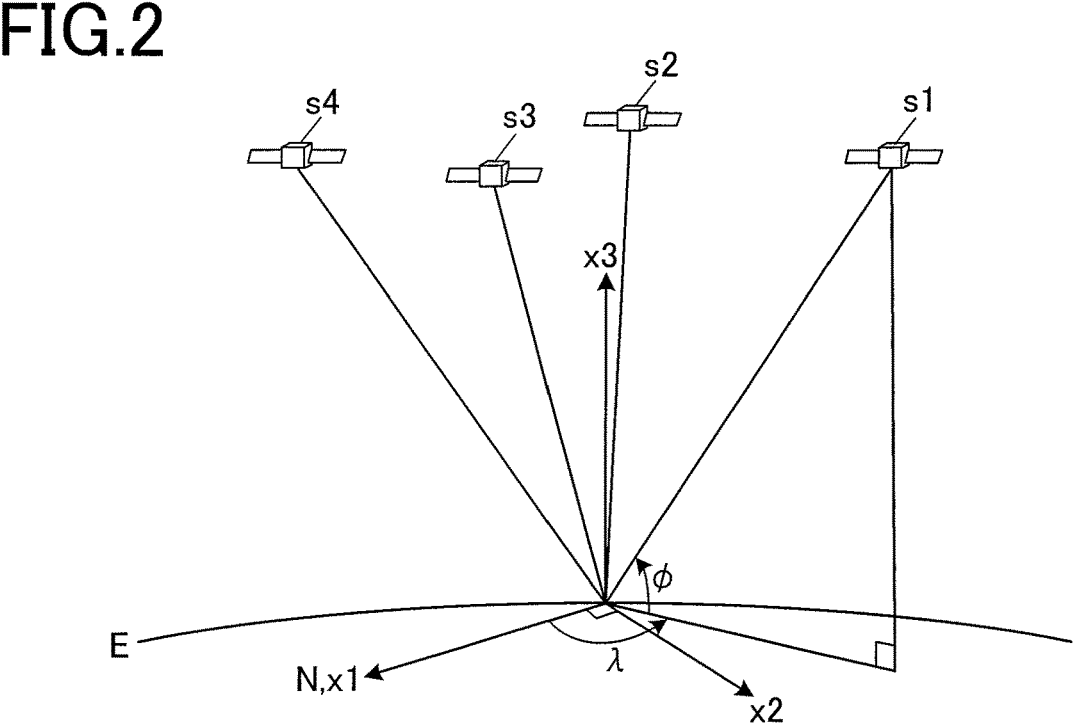
FIG. 2 illustrates a method of calculating accuracy.

FIG. 2 illustrates a method of calculating the accuracy of the electronic timepiece 1 according to this embodiment.

For a positioning satellite from which radio waves can be received, its relative direction to the current position is determined with an elevation angle $\varphi$ and an azimuth angle $\lambda$. The elevation angle $\varphi$ is an angle between the line connecting the current position and the positioning satellite and a horizontal plane E; a direction $x_3$ is perpendicular to the horizontal plane E. The azimuth angle $\lambda$ is an angle between the component on the horizontal plane E of the line connecting the current position and the positioning satellite and the north pole direction N; the north pole direction N is defined by the direction $x_1$ and the direction perpendicular to the direction $x_1$ on the horizontal plane E is defined by a direction $x_2$. When multiple positioning satellites from which radio waves are received are distributed appropriately, more accurate three components of the current position and a more accurate time component can be obtained. If the multiple positioning satellites are distributed unevenly with respect to the current position, the obtained accuracy is low. Depending on the direction of uneven distribution, for example, the horizontal position accuracy may be good but the vertical position (altitude) accuracy may not very good, for example.

The dilution of precision (DOP) used as an index of positioning accuracy is represented by $D=A^T \cdot A$ on a matrix A (x) of n rows and 4 columns that consists of three directional components ($x_{ij}$, j=1 to 3) relative to the current position of each positioning satellite $s_i$ (i=1 to n, n represents the number of positioning satellites used for positioning) and a time component ($x_{i4}$; here, $x_{i4}=1$), i.e., the diagonal component of the inverse matrix $D^{-1}=U$ of the matrix D of four rows and four columns having j and k components which are expressed with $D_{jk}=\Sigma_{(i=1-n)} (x_{ij} \cdot x_{ik})$. This indicates that DOP solely depends on the position of each positioning satellite $s_i$. The three directional components of the i-th positioning satellite having a vector length of 1 can be calculated with $(x_{i1}, x_{i2}, x_{i3}) = (\cos \lambda_i \cdot \cos \phi_i, \sin \lambda_i \cdot \cos \phi_i, \sin \phi_i)$. As a result, HDOP, a DOP regarding accuracy in horizontal direction, is expressed by $(|u_{11}|+|u_{22}|)^{1/2}$ using diagonal components $u_{ii}$ of the matrix U; VDOP, a DOP regarding accuracy in vertical direction, is expressed by $(|u_{33}|)^{1/2}$; PDOP, a DOP regarding accuracy in positional coordinate, is expressed by $(\Sigma_{(i=1 \text{ to } 3)}|u_{ii}|)^{1/2}$. These DOP values are each approximately 1 under the best conditions; a greater value indicate a lower accuracy.

In the electronic timepiece 1 according to this embodiment, an accuracy index value obtained by weighting the arrangement of each positioning satellite (the relative direction from the current position) with the ranging accuracy corresponding to the received radio wave intensity (here, SNR) from the positioning satellite is calculated.

Figure 3:
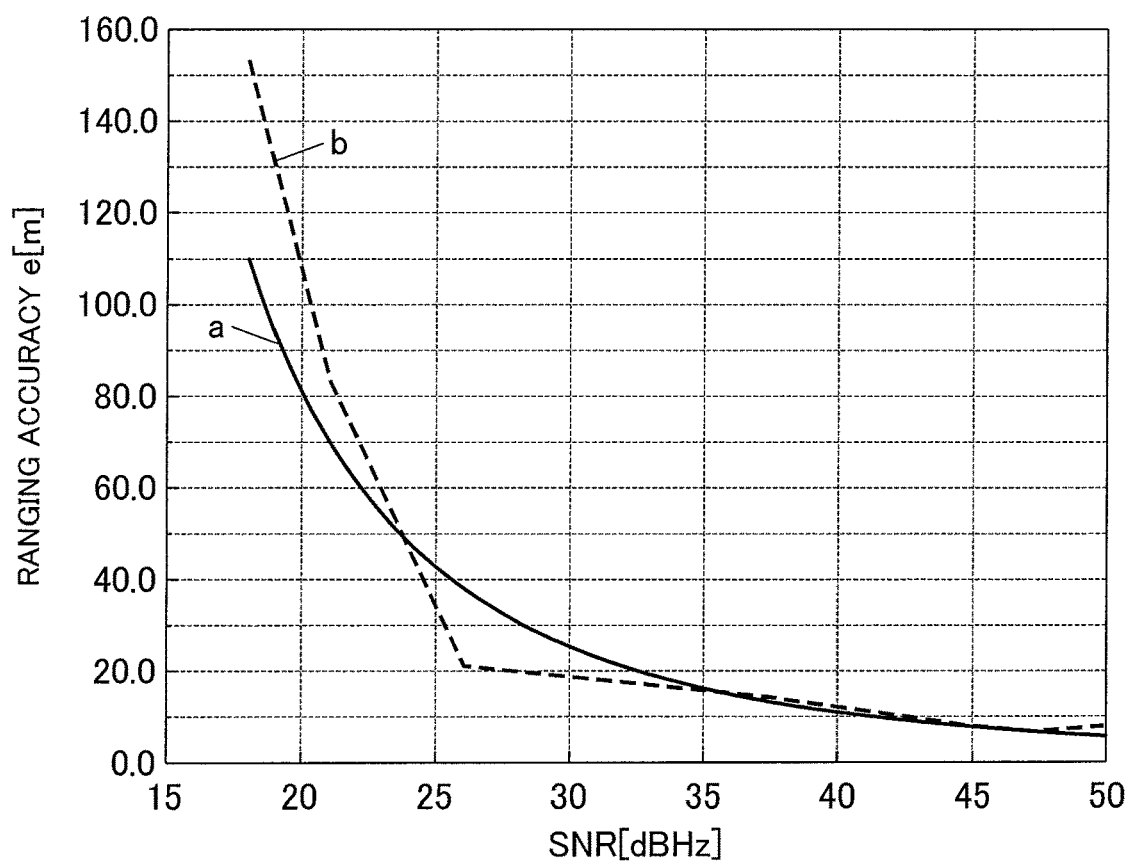
FIG. 3 illustrates a relation between a signal-to-noise ratio (SNR) of radio waves received from a positioning satellite and a ranging accuracy for the positioning satellite from which radio waves are received at the SNR.

FIG. 3 illustrates a relation between a SNR of radio waves received from a positioning satellite and a ranging accuracy for the positioning satellite from which radio waves are received at the SNR.

As an SNR [dBHz] reduces, the accuracy for determining a pseudo range (a ranging accuracy $e_i$ [km]) also deteriorates (the value increases), i.e., the maximum deviation expected at a position obtained through positioning increases. As shown by the solid line a in FIG. 3, the ranging accuracy $e_i$ improves (its value decreases) in accordance with an exponential function, as the SNR increases. This relation is stored as the ranging accuracy/SNR conversion data 632 in the ROM 63 before shipment of the product in the form of table data obtained based on measurements (or examination) or a calculating formula. In the case where the ranging accuracy/SNR conversion data 632 is in the form of table data, the ranging accuracy $e_i$ corresponding to the intermediate value among the SNR values in the table maybe calculated through interpolation. In the case where the ranging accuracy/SNR conversion data 632 in the form of calculating formula, the calculating formula may be an approximation formula provided that required accuracy is retained. The calculating formula may be simply expressed by a combination of several straight lines, for example, as shown by the broken line b in FIG. 3.

As described above, radio waves are received from a plurality of positioning satellites and used to perform positioning operation. A combination of SNRs or ranging accuracies $e_i$ of positioning satellites causes a variation in the maximum deviation that may be included in the final positioning result. Here, the first error range is calculated as follows: Each element $(x_{ij} \cdot x_{ik})$ of each component $D_{jk}=\Sigma_{(i=1 \text{ to } n)} (x_{ij} \cdot x_{ik})$ of the matrix D is weighted with the ranging accuracy $e_i$ corresponding to the SNR for each positioning satellite $s_i$, i.e., with $e_i^{-2}$. Using the weighting matrix W of n rows and n columns having diagonal components $w_{ii}$ set to $e_i^{-2}$ (all non-diagonal components are set to "0"), the positioning accuracy $\Delta x$ weighted with a received strength by $D^{-1}=U$, the inverse matrix of the matrix $D=A^T \cdot W \cdot A$ (each component $D_{jk}=\Sigma_{(i=1 \text{ to } n)} (x_{ij} \cdot w_{ii} \cdot x_{ik})$) is calculated. As described above, the DOP values under the best conditions are approximately 1. Therefore, the positioning accuracy $\Delta x$ (such as $\Delta h$ corresponding to HDOP and $\Delta z$ corresponding to VDOP) is in the same order as that of the square root of the square of a ranging accuracy $e_i$, i.e., the same order as that of the ranging accuracy $e_i$. Alternatively, the positioning accuracy $\Delta x$ may be suitably multiplied by a predetermined factor. In this way, an accuracy index related to the positioning accuracy can be obtained in consideration of not only the arrangement of the positioning satellites but also the radio wave reception state.

Next, the intermittent positioning operation of the electronic timepiece 1 (satellite radio wave receiving device) according to this embodiment will now be described.

In the electronic timepiece 1, one positioning result is adopted at every predetermined time period (here, for example, one minute). The receiver 51 starts receiving operation every time the predetermined period (one minute) elapses, and the positioning calculation is performed every second. The satellite radio wave receiving unit 50 determines whether or not the number of positioning satellites from which the radio waves are received and the positioning accuracy value of the calculated current position satisfy the predetermined accuracy condition. When the accuracy condition is satisfied, it is decided to adopt the current position (positioning result), and the current position is adopted. Thereafter, the positioning calculation is terminated and the receiving operation by the receiver 51 is also stopped. If the accuracy condition is not satisfied, the receiving operation and the positioning operation are continuously repeated. If a positioning result satisfying the accuracy condition cannot be adopted within the receiving time limit (upper limit) which is less than a predetermined period, here, for example, 30 seconds or less, the best result (the one with the highest positioning accuracy) obtained within that 30 seconds is adopted.

Figure 4:
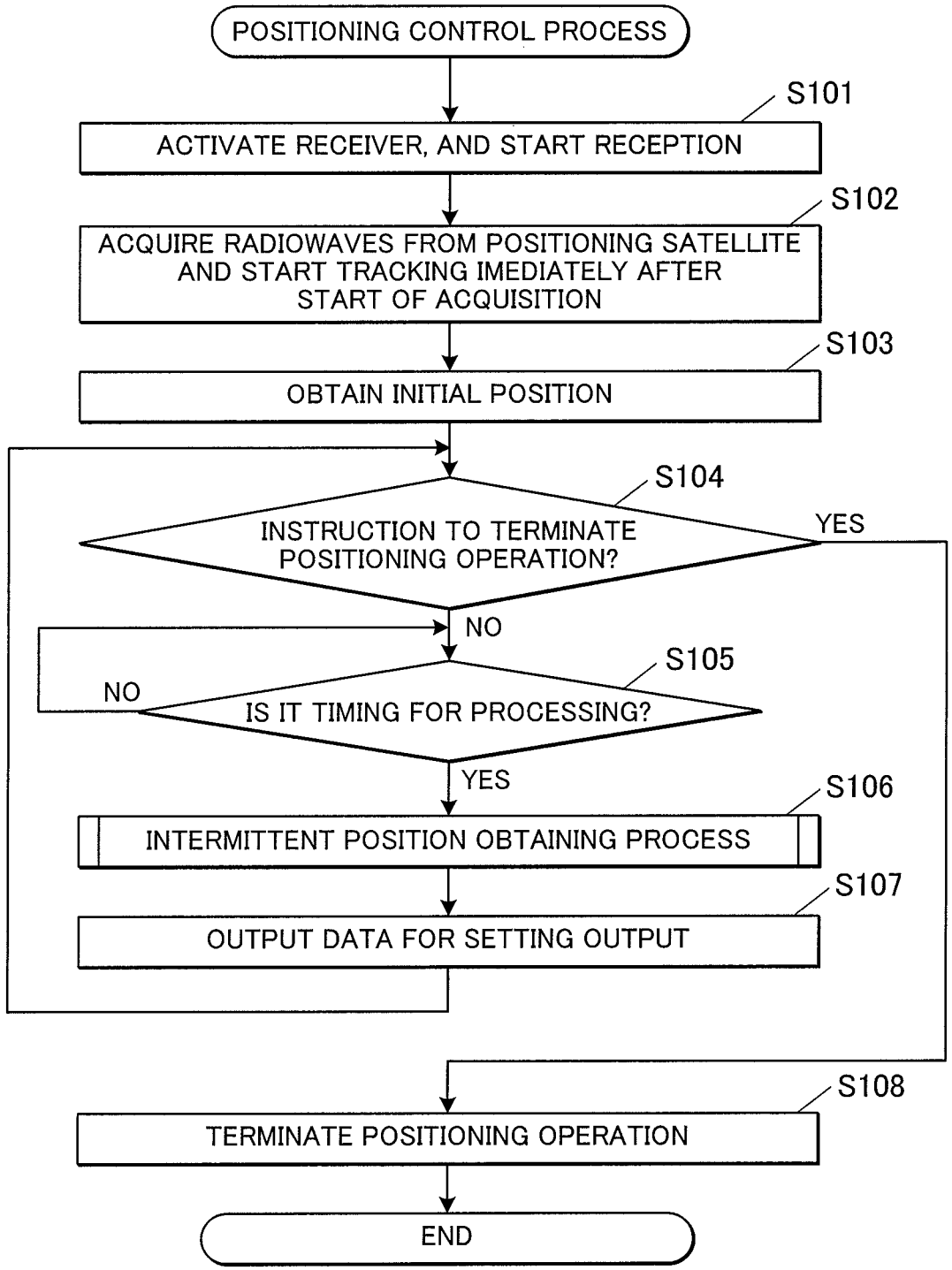
FIG. 4 illustrates a control procedure of a positioning control process.

FIG. 4 is a flowchart illustrating a control procedure performed by the module processor 52 for controlling the positioning process in the electronic timepiece 1 according to this embodiment.

This positioning control process is started when the operation receiver 61 receives a predetermined input operation. Alternatively, it may be activated automatically when the electronic timepiece 1 is activated.

At the start of the positioning control process, the module processor 52 activates the receiver 51 to start receiving radio waves from positioning satellites (Step S101). The module processor 52 causes the receiver 51 to perform an acquiring operation of radio waves from positioning satellites and to start tracking operation as soon as the radio waves are acquired (Step S102). When radio waves of the required number of positioning satellites are obtained, the module processor 52 obtains the initial position by performing positioning calculation (step S103).

The module processor 52 determines whether a termination instruction on positioning operation has been obtained (step S104). The termination instruction on positioning operation is sent from the host processor 41 if the operation receiver 61 received a predetermined input operation, or if the operation proceeds to a power save mode in which the positioning operation is stopped due to insufficient power supplied from the power supply 70, for example. If it is determined that the termination instruction has been obtained ("YES" at step S104), the module processor 52 performs processing for terminating positioning operation (step S108), and terminates the positioning control process.

If it is determined that the termination instruction on positioning operation has not been obtained ("NO" in step S104), the module processor 52 determines whether or not it is the processing timing related to the intermittent position obtaining process (step S105). This processing timing may be, for example, once per second, and may be synchronized with the timing of the exact second of the date and time counted by the timing circuit 47, or may be a timing of one second period from an arbitrary timing. If it is determined that it is not the processing timing ("NO" in step S105), the module processor 52 repeats the process of step S105.

If it is determined that it is the processing timing ("YES" in step S105), the module processor 52 invokes and executes the intermittent position obtaining process (step S106). After termination of the intermittent position obtaining process, the module processor 52 outputs output setting data at an appropriate timing (step S107). The output data is output to a positioning history information 532 of the storage unit 53 and the host processor 41. The output to the host processor 41 may be performed based on a request from the host processor 41. Then, the process of the module processor 52 returns to step S104.

Figure 5:
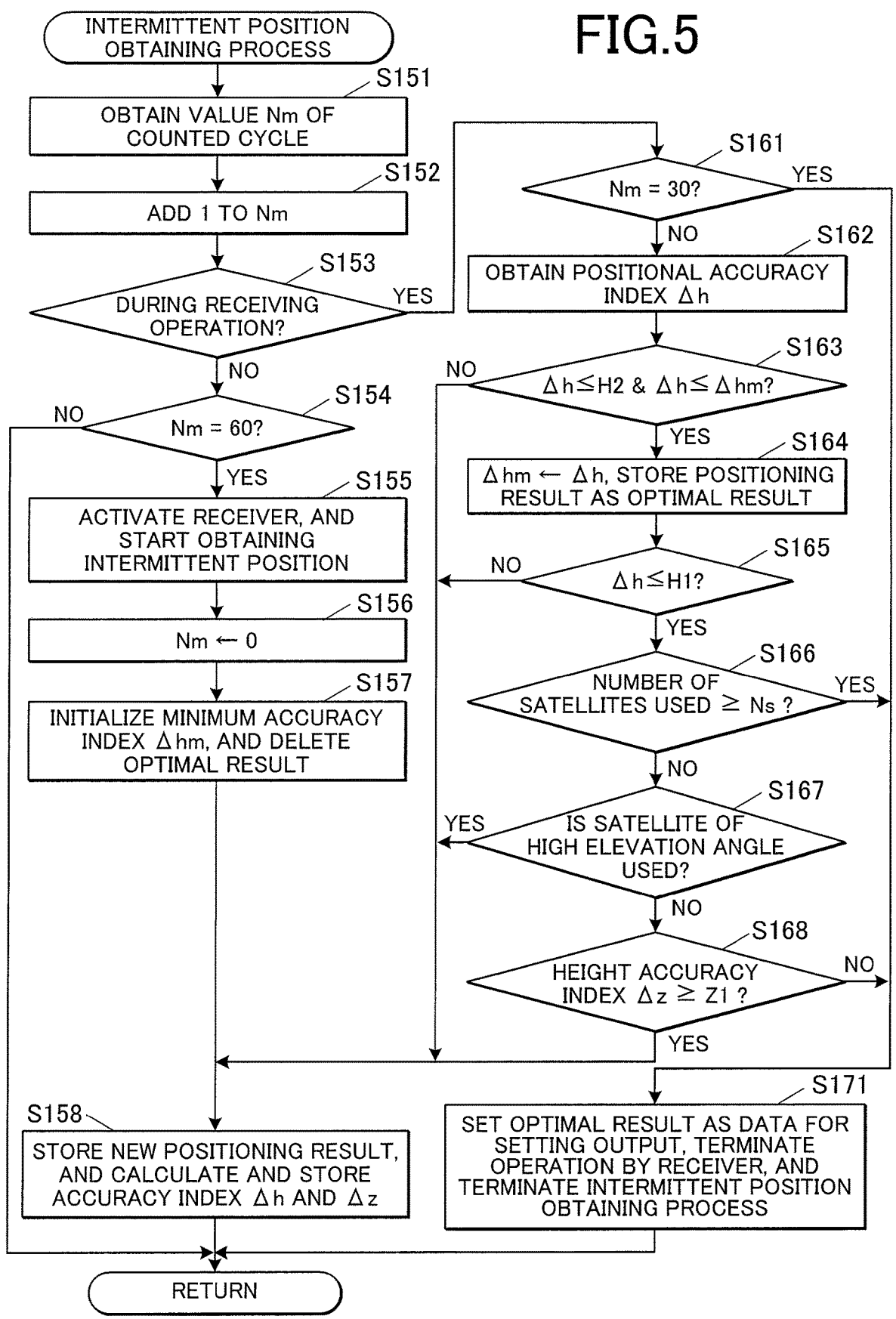
FIG. 5 illustrates a control procedure of an intermittent position obtaining process.

FIG. 5 is a flowchart illustrating a control procedure performed by the module processor 52 for the intermittent position obtaining process called in the positioning control process.

When the intermittent position obtaining process is called, the module processor 52 reads the cycle counter value Nm from the RAM (step S151). This cycle counter value Nm is for counting one minute period related to the frequency of executing intermittent positioning. The module processor 52 adds "1" to the cycle counter value Nm (step S152). The module processor 52 determines whether or not the receiving operation of the receiver 51 is in progress (step S153).

If it is determined that the receiving operation is not in progress ("NO" in step S153), the module processor 52 determines whether or not the cycle counter value Nm is "60" (step S154). If it is determined that the value is not "60" ("NO" in step S154), the module processor 52 terminates the intermittent position obtaining process and returns the process to the positioning control process.

When it is determined that the cycle counter value Nm is "60" ("YES" in step S154), the module processor 52 activates the receiver 51 and starts receiving operation and positioning calculation process (step S155; activation controller, activation control step). The module processor 52 initializes the cycle counter value Nm to "0" (step S156). The module processor 52 initializes the accuracy index minimum value Δhm and erases the stored optimum result (step S157). The initial value of the accuracy index minimum value Δhm is a fixed value recognized as an initial value in the process, a second reference value H2 as a positioning accuracy index Δh, and the like. The second reference value H2 is, for example, 100 (meters).

The module processor 52 performs positioning calculations based on the contents received by the receiver 51 and stores the positioning result. The stored positioning result may be overwritten and updated each time. Further, the module processor 52 calculates and stores the above positioning accuracy value Δx (=(Δh, Δz)) as the accuracy index value (step S 158; calculator, calculation step). Then, the module processor 52 terminates the intermittent position obtaining process and returns the process to the positioning controller.

If it is determined that receiving operation of the receiver 51 is in progress ("YES" in step S153) in the determination processing in step S153, the module processor 52 determines whether or not the cycle counter value Nm is a value corresponding to the receiving time limit ("30" here) (step S161). If it is determined that the cycle counter value Nm is "30" ("YES" in step S161), the process proceeds to step S171. If it is determined that the cycle counter value Nm is not "30" ("NO" in step S161), the module processor 52 reads the stored positioning accuracy index Δh regarding the horizontal direction stored in the RAM (step S162).

The module processor 52 determines whether or not the positioning accuracy index Δh is equal to or less than the second reference value H2 and equal to or less than the stored accuracy index minimum value Δhm (whether or not the positioning accuracy satisfies a first criterion) (step S163). If the initial value of the accuracy index minimum value Δhm is the second reference value H2 as described above, since the accuracy index minimum value Δhm is necessarily less than or equal to the second reference value H2, comparison with the second reference value H2 is not necessary. If it is determined that at least one of them is not satisfied ("NO" in step S163), the process of the module processor 52 proceeds to step S158.

If it is determined that the positioning accuracy index Δh is equal to or less than the second reference value H2 and equal to or less than the accuracy index minimum value Δhm ("YES" in step S163), the module processor 52 sets the positioning accuracy index Δh as the accuracy index minimum value Δhm. The module processor 52 causes the RAM to separately update the stored positioning result as an optimum result (step S164).

The module processor 52 determines whether or not the positioning accuracy index Δh is equal to or less than a first reference value H1 (step S165). The first reference value H1 is a lower limit value of sufficient positioning accuracy obtained by normal satellite positioning, and is, for example, 15 (meters). If it is determined that the positioning accuracy index Δh is not equal to or less than (that is, larger than) the first reference value H1 ("NO" in step S165), the process of the module processor 52 proceeds to step S158.

If is determined that the positioning accuracy index Δh is equal to or less than the first reference value H1 ("YES" in step S165), the module processor 52 determines whether or not the number of radio signals used for the positioning calculation is equal to or more than the reference number Ns (lowest setting number) (step S166). As described above, the number of radio signals is required to be 4 or more for three-dimensional positioning calculation, but in order to obtain a higher positioning accuracy more stably, it is better to have more radio wave signals. Here, "6" is set as the reference number Ns. If it is determined that the number of radio signals is equal to or more than the reference number Ns ("YES" in step S166), the process of the module processor 52 proceeds to step S171.

If it is determined that the number of radio signals used for the positioning calculation is not equal to or more than (that is, less than) the reference number Ns ("NO" in step S166), the module processor 52 decides whether or not the current position may be adopted, on the basis of information on the positioning accuracy in the altitude direction, here, the presence/absence of a high altitude angle satellite and the position accuracy index Δz in the altitude direction in the received radio wave. The module processor 52 determines whether or not a radio signal from a high altitude angle satellite which sends radio waves from a predetermined altitude angle (for example, 60 degrees) or more has been used for positioning calculation (step S167). If it is determined to be used ("YES" in step S167), the process of the module processor 52 proceeds to step S158.

If it is determined that the radio signal from the high altitude angle satellite is not used for the positioning calculation ("NO" in step S167), the module processor 52 determines whether or not the accuracy index Δz of the position in the altitude direction is equal to or more than an altitude reference value Z1 (step S168). If it is determined to be equal to or more than the altitude reference value Z1 ("YES" in step S168), the process of the module processor 52 proceeds to step S158. If it is determined not to be equal to or more than (that is, less than) the altitude reference value Z1 ("NO" in step S168), the process of the module processor 52 moves to step S171.

The processes of the above-described steps S165 and S166 constitute the adoption determiner (adoption determination step in the positioning control method) in the satellite radio wave receiving unit 50 of the present embodiment. The adoption determiner (adoption determination step) may further include respective processes of steps S158, S161 to S164, S167, and S168.

After proceeding from the respective determination processes of steps S161, S166, and S168 to the process of step S171, the module processor 52 sets the currently stored optimum result as output data. The module processor 52 stops the operation of the receiver 51 and stops the process related to adopting the current position during this one minute (step S171; stop controller, stop control step). Then, the module processor 52 terminates the intermittent position obtaining process and returns the process to the positioning control process.

The accuracy condition and the receiving time limit for stopping the receiving operation need not be fixed and can be set to various values depending on the usage of the positioning result, specifically, the type and operation mode (high-accuracy mode or power saving mode, etc.) of the requesting application software. These values may be changed and set on the basis of the predetermined input operation accepted by the operation receiver 61.

[Modification]

FIG. 6 is a flowchart illustrating modification of the intermittent position obtaining process.

The accuracy index value considering both the positional relationship of the positioning satellites and the parameters regarding the reception state is calculated and used in the above embodiment, however, they may be separately evaluated. Here, DOP and SNR are separately evaluated.

In the intermittent position obtaining process of this modification, the processes of steps S158, S162 to S164, and S168 in the intermittent position promotion process of the above embodiment are respectively replaced by steps S158a, S162a to S164a, and S168a, and the processing of step S165 is replaced by two processing of step S165a and step S165b. The other processes are the same, and the contents of the same processes are denoted by the same reference numerals, and a detailed description thereof will be omitted.

If the process proceeds to "NO" in step S161, the module processor 52 obtains respective values of the HDOP, the VDOP, and the SNR that have been calculated(step S162a). The module processor 52 determines whether or not the value of HDOP is equal to or less than a fourth reference value H4 corresponding to the second reference value and is equal to or less than the accuracy index minimum value $\Delta$hm (here, the minimum value of HDOP set in step S164a) (Step S163a). As in the above case, if the initial value of the accuracy index minimum value $\Delta$hm is the fourth reference value H4, the former comparison is unnecessary. When it is determined that either of them is not satisfied ("NO" in step S163a), the process of the module processor 52 proceeds to step S158a.

If it is determined that the value of HDOP is equal to or less than the fourth reference value H4 and equal to or less than the accuracy index minimum value $\Delta$hm ("YES" in step S163a), the module processor 52 sets the current HDOP value as the accuracy index minimum value $\Delta$hm, and separately stores the corresponding positioning result as the optimum result (step S164a). The module processor 52 determines whether or not the value of HDOP is equal to or less than a third reference value H3 (<the fourth reference value H4) corresponding to the first reference value H1 (step S165a). If it is determined that it is not equal to or less than the third reference value H3 ("NO" in step S165a), the process of the module processor 52 proceeds to step S158a.

If it is determined that the value of HDOP is equal to or less than the third reference value H3 ("YES" in step S165a), the module processor 52 determines whether or not the value of SNR is equal to or more than a reference value L1 (step S165b). The reference value L1 is a value at which sufficient ranging accuracy can be obtained. For example, a value of about 35 to 40 (dBHz) is set as a value corresponding to the ranging accuracy of 15 m in FIG. 3. If it is determined that it is not equal to or more than the reference value L1 ("NO" in step S165b), the process of the module processor 52 proceeds to step S158a. If it is determined that the value is equal to or more than the reference value L1 ("YES" in step S165b), the process of the module processor 52 proceeds to step S166.

If the determination process of step S167 proceeds to "NO", the module processor 52 determines whether or not the value of the VDOP is equal to or more than an altitude reference value Z2 corresponding to the altitude reference value Z1 (step S168a). If it is determined that the altitude reference value is equal to or more than the altitude reference value Z2 ("YES" in step S168a), the process of the module processor 52 proceeds to step S158a. If it is determined that the value of VDOP is not equal to or more than the altitude reference value Z2 ("NO" in step S168a), the process of the module processor 52 proceeds to step S171.

If the process proceeds to "YES" in step S167, the processing of the module processor 52 proceeds to step S158a.

If the process proceeds from each of the steps S157, S163a, S165a, S165b, S167, and S168a to step S158a, the module processor 52 updates and stores the newly calculated positioning result, calculates and stores the respective values of HDOP, VDOP and SNR (step S158a). Then, the module processor 52 terminates the intermittent position obtaining process and returns the process to the positioning control process.

As described above, the satellite radio wave receiving unit 50, which is the satellite radio wave receiving device of the present embodiment, includes a receiver 51 that performs the operation of receiving radio waves from the positioning satellite, and a module processor 52 that calculates the current position based on the radio wave received by the receiver 51. The module processor 52 causes the receiver 51 to start the receiving operation as the activation controller, and calculates the current position as the calculator. The module processor 52 decides whether or not to adopt the current position based on the number of positioning satellites from which the receiver 51 has received the radio waves and the calculated positioning accuracy of the current position as the adoption determiner. As the stop controller, the module processor 52 stops the receiving operation if the current position is adopted, and continues the receiving operation by repeating the calculation of the current position if the current position is not adopted.

In this way, the positioning result is appropriately adopted based on not only the number of positioning satellites from which radio waves are received, but also whether or not a desired positioning accuracy can be obtained in the radio wave receiving state. Therefore, it is possible to more reliably obtain highly accurate position information while preventing the receiving operation from continuing more than necessary by continuous reception and repeated positioning calculation, considering the case where the receiving state is bad due to the building structure or geographical features in spite of an appropriate arrangement of the positioning satellites, or the case where the incorrectly converged position cannot be properly corrected due to the number of positioning satellites is marginal in spite of the goof receiving state.

Further, the module processor 52 obtains the positioning accuracy on the basis of the radio wave receiving state from each positioning satellite. Other than the number and position of the positioning satellites from which the radio waves were received, the required positioning accuracy is greatly affected and reduced by the radio wave receiving state. Therefore, by calculating the positioning accuracy also on the basis of the radio wave receiving state (in particular, SNR), it is possible to improve the certainty of the positioning accuracy and to obtain accurate position information.

Further, the module processor 52 causes the receiver 51 to start the receiving operation at every predetermined period. That is, since the positioning result is adopted based on the positioning accuracy as described above in the intermittent positioning, it is possible to continually obtain accurate current position information while appropriately controlling the time for reception operation.

If it is not decided to adopt the current position within the receiving time limit (30 seconds), which is less than the predetermined period (1 minute), the module processor 52 obtains the current position having the highest positioning accuracy among those calculated within the receiving time limit (30 seconds) for adoption, and causes the receiver to stop the receiving operation.

That is, if the current position has been adopted with a certain degree of accuracy, the receiving operation is terminated suitably rather than continued too long, so that an optimum current position is obtained for adoption within the receiving operation time. It is possible to appropriately maintain balance between power consumption and positioning accuracy.

Further, the module processor 52 adopts the current position if the positioning accuracy in the horizontal direction satisfies the first criterion and if the number of the positioning satellites from which the radio waves are received is the lowest setting number (five) or more. That is, the visible state of low altitude angle positioning satellites, which is likely to affect the horizontal positioning accuracy, tends to change in a short time. Therefore, by determining whether or not to continue the receiving operation and the positioning calculation preferentially taking the low altitude angle positioning satellites into consideration, it is possible to adjust the balance between the power consumption and the positioning accuracy more flexibly and appropriately and to adopt an accurate current position more stably.

If the positioning accuracy in the horizontal direction satisfies the first criterion and the number of positioning satellites from which radio waves are received is less than the lowest setting number (5), the module processor 52 decides whether or not to adopt the current position in consideration of the information on the positioning accuracy in the altitude direction (the number and the accuracy index $\Delta z$ of the position in the altitude direction of high altitude angle satellites). That is, if the number of positioning satellites used for the positioning calculation is small, even if the positioning accuracy in the horizontal direction satisfies the criterion, the possibility that the calculation does not converge correctly cannot be excluded. Therefore, by considering information as to whether or not the component in the altitude direction of the current position is also accurately determined, it is possible to more accurately determine whether or not the correct convergence calculation has been performed.

The electronic timepiece 1 of the present embodiment includes the above satellite radio wave receiving unit 50 and a timing circuit 47. With such an electronic timepiece, it is possible to adopt the current position with higher accuracy while appropriately suppressing the power consumption, so that it is possible to miniaturize the necessary battery. Thus, while suppressing the increase in size and weight of the timepiece, it is possible to accurately acquire the current position and to perform notification (or to display) to the user.

Further, the positioning control method by the satellite radio wave receiving unit 50 of the present embodiment includes the following steps: an activation control step of causing the receiver 51 to start receiving operation; a calculation step of calculating a current position on the basis of the radio waves received by the receiver 51; an adoption determination step of deciding whether or not to adopt the current position on the basis of the number of positioning satellites from which the receiver 51 has received the radio waves and the calculated positioning accuracy of the current position; and a stop control step of causing the receiver to stop the receiving operation if the current position is adopted, and to continue the receiving operation and to repeat calculation of the current position if the current position is not adopted.

With such a positioning control method, the positioning result is appropriately adopted based on not only the number of positioning satellites from which radio waves are received, but also whether or not a desired positioning accuracy can be obtained in the radio wave receiving state. Therefore, it is possible to more reliably obtain highly accurate position information while preventing the receiving operation from continuing more than necessary by continuous reception and repeated positioning calculation, considering the case where the receiving state is bad due to the building structure or geographical features in spite of an appropriate arrangement of the positioning satellites, or the case where the incorrectly converged position cannot be properly corrected due to the number of positioning satellites is marginal in spite of the good receiving state.

The above embodiments are examples and various modifications can be made.

For example, in the case where the positioning is continuously performed, the current position at the next positioning may be estimated to some extent on the basis of the past movement history. Besides the positioning calculation, such an estimated position may be obtained and the difference between the measured position adopted as the positioning result and the estimated position maybe used as an index of positioning accuracy.

For example, the moving speed and the moving acceleration are obtained based on the amount of change in position obtained from the position information obtained in the most recent multiple times (at least twice). If there is no large acceleration or change thereof, the moving speed of the electronic timepiece 1 (the satellite radio wave receiving device) is calculated based on the change in position (and the change in moving speed as necessary), and the next position is estimated on the basis of this moving speed and the previous measured position.

When calculating the positioning accuracy index based on the deviation of the actual measurement from such predicted value, it is not necessary to use the value of the measured position as it is in consideration of the deviation of the previous measured position. Using the previous measured position and the previous predicted position, a more likely plausible previous estimated position may be obtained and used for the estimation of the next position. Any appropriate method may be used for estimating the position, such as a Kalman filter. If the Kalman filter is not used, similar to the covariance matrix of errors in the Kalman filter, the estimated position may be obtained by moderately weighting the positions based on the amount of deviation between the predicted position and the measured position.

Further, the positioning accuracy index obtained based on such estimated position and the above-mentioned positioning accuracy index Δh may be used in combination. The combination method may include, for example, obtaining both of them and simply using the larger one.

In the above embodiment, the positioning accuracy in the horizontal direction was mainly considered as the positioning accuracy, and the positioning accuracy in the altitude direction is considered only in a specific case. However, the three-dimensional directional positioning accuracy maybe taken into consideration from the beginning. Alternatively, on the contrary, the positioning accuracy in the altitude direction may not be taken into consideration. Depending on the degree of significance of position information in the altitude direction, the branch of "YES" and "NO" in step S167 may be interchanged.

Alternatively, whether or not the positioning result (current position) can be adopted and whether or not the to stop the receiving operation maybe determined based on the positioning accuracy obtained by various methods other than the above.

In the above embodiment, the case of intermittent reception in which the positioning result is adopted once a minute is described as an example. However, positioning calculation may be repeated until conditions for the number of positioning satellites and the positioning accuracy are satisfied, in the case of adopting a single positioning result as well. Further, in the case of intermittent reception, it is not necessary that the receiver 51 is periodically activated. The interval of the start timing of the reception operation by the receiver 51 maybe changed according to other conditions, for example, the moving state of the satellite radio wave receiving device detected by an acceleration sensor or the like. Further, the receiving operation by the receiver 51 may be started one (1) minute after the timing when the positioning result was finally adopted in the last process.

In the above embodiment, the decision of whether or not to continue the positioning calculation and the receiving operation is made by the module processor 52, but it may be made by the host processor 41. In this case, information on positioning accuracy and number of satellites may be output from the module processor 52 to the host processor 41, so that the host processor 41 can make the decision based on the information. Alternatively, the host processor 41 may calculate the positioning accuracy.

Although the host processor 41 and the module processor 52 are separately provided in the above embodiment, an electronic timepiece 1 (satellite radio wave receiving apparatus) may have a single processor. In addition, although the module processor 52 as a processor includes a CPU and performs control operation by software in the above embodiment, a dedicated hardware circuit or the like may be provided and a part of the process may be performed by the hardware circuit. Alternatively, the module processor 52 may further include a CPU and RAM for exclusively performing a part of software processing.

In the above description, the programs 631 for positioning control and display settings are stored in a computer-readable medium, including a nonvolatile memory such as a flash memory, and/or the ROM 63 such as a mask ROM, though not limitative in any way. Any other type of computer-readable recording medium may be used, for example, a portable recording medium, such as hard disk drive (HDD), CD-ROM, and DVD disk.

It should be understood that the details of the configurations, control procedures, and display examples shown in the above embodiment can be appropriately modified without departing from the scope of the disclosure.

The embodiments described above should not be construed to limit the present invention, and the claims and other equivalents thereof are included in the scope of the invention.

What is claimed is:

1. A satellite radio wave receiving device comprising:
one or more processors configured to:
    cause a receiver to start a receiving operation of receiving radio waves from positioning satellites every time a predetermined period elapses;
    perform a current position calculation to calculate a current position based on the radio waves received by the receiver;
    calculate a positioning accuracy of the current position;
    decide whether or not to adopt the current position based on a number of positioning satellites from which the receiver has received radio waves and the positioning accuracy of the current position;
    in response to deciding to adopt the current position, cause the receiver to stop the receiving operation;
    in response to deciding to not adopt the current position,
        cause the receiver to continue the receiving operation of receiving radio waves from the positioning satellites;
        repeat performance of the current position calculation to calculate current positions based on the radio waves received during the continued receiving operation; and
        calculate positioning accuracies of the current positions that are repeatedly calculated; and
    while causing the receiver to continue the receiving operation of receiving radio waves from the positioning satellites,
        determine whether a receiving time limit which is less than the predetermined period has passed; and
        in response to determining that the receiving time limit has passed, adopt one of the current positions having a highest positioning accuracy, and cause the receiver to stop the receiving operation.

2. The satellite radio wave receiving device according to claim 1,
wherein the one or more processors are configured to:
    determine a receiving state of the radio waves from each of the positioning satellites; and
    calculate the positioning accuracy based on the receiving state of the radio waves from each of the positioning satellites.

3. The satellite radio wave receiving device according to claim 2,
  wherein the one or more processors are configured to:
    in calculating the positioning accuracy of the current position, calculate the positioning accuracy in a horizontal direction;
    determine whether the positioning accuracy in the horizontal direction satisfies a first criterion; and
    determine whether the number of the positioning satellites from which radio waves are received is equal to or more than a lowest setting number; and
    in response to determining that the positioning accuracy in the horizontal direction satisfies the first criterion and the number of the positioning satellites from which radio waves are received is equal to or more than the lowest setting number, decide to adopt the current position.

4. The satellite radio wave receiving device according to claim 3,
  wherein the one or more processors are configured to:
    in calculating the positioning accuracy of the current position, calculate the positioning accuracy in an altitude direction; and
    in response to determining that the positioning accuracy in the horizontal direction satisfies the first criterion and the number of positioning satellites from which radio waves are received is less than the lowest setting number, decide whether or not to adopt the current position based on the positioning accuracy in the altitude direction.

5. An electronic timepiece comprising:
  the satellite radio wave receiving device according to claim 2;
  the receiver; and
  a clock circuit configured to count a current date and time.

6. The satellite radio wave receiving device according to claim 1,
  wherein the one or more processors are configured to:
    in calculating the positioning accuracy of the current position, calculate the positioning accuracy in a horizontal direction;
    determine whether the positioning accuracy in the horizontal direction satisfies a first criterion; and
    determine whether the number of the positioning satellites from which radio waves are received is equal to or more than a lowest setting number; and
    in response to determining that the positioning accuracy in the horizontal direction satisfies the first criterion and the number of the positioning satellites from which radio waves are received is equal to or more than the lowest setting number, decide to adopt the current position.

7. The satellite radio wave receiving device according to claim 6,
  wherein the one or more processors are configured to:
    in calculating the positioning accuracy of the current position, calculate the positioning accuracy in an altitude direction; and
    in response to determining that the positioning accuracy in the horizontal direction satisfies the first criterion and the number of positioning satellites from which radio waves are received is less than the lowest setting number, decide whether or not to adopt the current position based on the positioning accuracy in the altitude direction.

8. An electronic timepiece comprising:
  the satellite radio wave receiving device according to claim 1;
  the receiver; and
  a clock circuit configured to count a current date and time.

9. A satellite radio wave receiving device comprising:
  means for causing a receiver to start a receiving operation of receiving radio waves from positioning satellites every time a predetermined period elapses;
  means for performing a current position calculation to calculate a current position based on the radio waves received by the receiver;
  means for calculating a position accuracy of the current position;
  means for deciding whether or not to adopt the current position based on a number of positioning satellites from which the receiver has received radio waves and the positioning accuracy of the current position;
  means for, in response to deciding to adopt the current position, causing the receiver to stop the receiving operation;
  means for, in response to deciding to not adopt the current position,
    causing the receiver to continue the receiving operation of receiving radio waves from the positioning satellites;
    repeating performance of the current position calculation to calculate current positions based on the radio waves received during the continued receiving operation; and
    calculating positioning accuracies of the current positions that are repeatedly calculated; and
  means for, while causing the receiver to continue the receiving operation of receiving radio waves from the positioning satellites,
    determining whether a receiving time limit which is less than the predetermined period has passed; and
    in response to determining that the receiving time limit has passed, adopting one of the current positions having a highest positioning accuracy, and causing the receiver to stop the receiving operation.

10. An electronic timepiece comprising:
  the satellite radio wave receiving device according to claim 9;
  the receiver; and
  a clock circuit configured to count a current date and time.

11. A positioning control method performed by a satellite radio wave receiving device including a receiver, the method comprising:
  causing the receiver to start a receiving operation of receiving radio waves from positioning satellites every time a predetermined period elapses;
  performing a current position calculation to calculate a current position based on the radio waves received by the receiver;
  calculating a positioning accuracy of the current position;
  deciding whether or not to adopt the current position based on a number of positioning satellites from which the receiver has received radio waves and the positioning accuracy of the current position;
  in response to deciding to adopt the current position, causing the receiver to stop the receiving operation;
  in response to deciding to not adopt the current position,
    causing the receiver to continue the receiving operation of receiving radio waves from the positioning satellites;

repeating calculation of the current position calculation to calculate current positions based on the radio waves received during the continued receiving operation; and calculating positioning accuracies of the current positions that are repeatedly calculated; and while causing the receiver to continue the receiving operation of receiving radio waves from the positioning satellites, determining whether a receiving time limit which is less than the predetermined period has passed; and in response to determining that the receiving time limit has passed, adopting one of the current positions having a highest positioning accuracy, and causing the receiver to stop the receiving operation.

12. A non-transitory computer-readable storage medium storing instructions that cause one or more computers to at least perform:

causing a receiver to start a receiving operation of receiving radio waves from positioning satellites every time a predetermined period elapses;

performing a current position calculation to calculate a current position based on the radio waves received by the receiver;

calculating a positioning accuracy of the current position;

deciding whether or not to adopt the current position based on a number of positioning satellites from which the receiver has received radio waves and the positioning accuracy of the current position;

in response to deciding to adopt the current position, causing the receiver to stop the receiving operation;

in response to deciding to not adopt the current position,
causing the receiver to continue the receiving operation of receiving radio waves from the positioning satellites;

repeating performance of the current position calculation to calculate current positions based on the radio waves received during the continued receiving operation; and calculating positioning accuracies of the current positions that are repeatedly calculated; and while causing the receiver to continue the receiving operation of receiving radio waves from the positioning satellites, determining whether a receiving time limit which is less than the predetermined period has passed; and in response to determining that the receiving time limit has passed, adopting one of the current positions having a highest positioning accuracy, and causing the receiver to stop the receiving operation.

* * * * *